(12) United States Patent
Zheng

(10) Patent No.: US 12,050,835 B2
(45) Date of Patent: Jul. 30, 2024

(54) DISPLAY MODULE AND DISPLAY DEVICE

(71) Applicant: TCL CHINA STAR OPTOELECTRONICS TECHNOLOGY CO., LTD., Guangdong (CN)

(72) Inventor: Feng Zheng, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,521

(22) PCT Filed: Mar. 10, 2022

(86) PCT No.: PCT/CN2022/080209
§ 371 (c)(1),
(2) Date: Apr. 29, 2022

(87) PCT Pub. No.: WO2023/168664
PCT Pub. Date: Sep. 14, 2023

(65) Prior Publication Data
US 2024/0168692 A1    May 23, 2024

(30) Foreign Application Priority Data
Mar. 8, 2022  (CN) .......................... 202210217881.7

(51) Int. Cl.
*G06F 3/14* (2006.01)
*G06F 3/147* (2006.01)
(52) U.S. Cl.
CPC ............ *G06F 3/1446* (2013.01); *G06F 3/147* (2013.01)

(58) Field of Classification Search
CPC ........... G02F 1/13336; G02F 1/133524; G02F 1/133562; G02F 1/133526; G02B 6/08;
(Continued)

(56) References Cited

U.S. PATENT DOCUMENTS 5,675,687 A    10/1997  Wood
9,477,112 B2 * 10/2016  Wu ...................... G02B 6/0051
(Continued)

FOREIGN PATENT DOCUMENTS

CN    101770732 A    7/2010
CN    103969864 A    8/2014
(Continued)

OTHER PUBLICATIONS

International Search Report in International application No. PCT/CN2022/080209, mailed on Oct. 26, 2022.
(Continued)

*Primary Examiner* — Koosha Sharifi-Tafreshi
(74) *Attorney, Agent, or Firm* — PV IP PC; Wei Te Chung; Zhigang Ma

(57) ABSTRACT

Disclosed are a display module and a display device. The display module includes at least two display panels that are spliced; The display module further includes a groove disposed between two adjacent display panels and a light guiding portion disposed in the groove. The light guiding portion includes a light-incident surface near a bottom of the groove and a light-exiting surface away from the bottom of the groove.

18 Claims, 2 Drawing Sheets

(58) Field of Classification Search
CPC .................. G02B 6/0078; G02B 5/045; G09G 2300/026; G09F 9/3026; G06F 3/1446
See application file for complete search history.

(56) References Cited

U.S. PATENT DOCUMENTS

| | | | |
|---|---|---|---|
| 10,416,950 B2* | 9/2019 | Kim | ..................... G02B 6/0078 |
| 2010/0238090 A1* | 9/2010 | Pomerantz | ........ G02F 1/133524 |
| | | | 345/1.3 |
| 2014/0286052 A1 | 9/2014 | McCollum et al. | |

FOREIGN PATENT DOCUMENTS

| CN | 104299519 A | 1/2015 |
|---|---|---|
| CN | 104516137 A | 4/2015 |
| CN | 106556890 A | 4/2017 |
| CN | 109785753 A | 5/2019 |
| CN | 112038371 A | 12/2020 |
| CN | 113419373 A | 9/2021 |
| CN | 113421878 A | 9/2021 |
| CN | 114141155 A | 3/2022 |

OTHER PUBLICATIONS

Written Opinion of the International Search Authority in International application No. PCT/CN2022/080209, mailed on Oct. 27, 2022.
Chinese Office Action issued in corresponding Chinese Patent Application No. 202210217881.7 dated Sep. 8, 2022, pp. 1-8.
Chinese Office Action issued in corresponding Chinese Patent Application No. 202210217881.7 dated Feb. 4, 2024, pp. 1-7.

* cited by examiner

DISPLAY MODULE AND DISPLAY DEVICE

TECHNICAL FIELD

The present application relates to the field of display technologies, and in particular, to a display module and a display device having the display module.

BACKGROUND

A liquid crystal display (LCD) is a flat panel display (FPD) device for displaying an image by using characteristics of a liquid crystal material, and has advantages of being thin and light, low driving voltage, low power consumption, and the like.

At present, a small-size display device such as a mobile phone screen can be formed in one-step molding in the industry. Considering the limitation by the size of the device, for a medium-size or large-size splicing screen, only a multi-screen splicing mode can be adopted to achieve a larger size. However, in the current splicing liquid crystal display, the image cannot be displayed at the splicing seam, resulting in a black seam, which seriously affects display effect of the splicing liquid crystal display.

Technical Problems

Embodiments of the present application provide a display module and a display device, which can emit light at the position between two adjacent display panels so as to eliminate a splicing seam between the display modules and improve the display effect of the display modules.

Technical Solution

An embodiment of the present application provides a display module, the display module includes at least two display panels, wherein two adjacent display panels are spliced in a first direction or a second direction, and the first direction is different from the second direction.

The display module comprises a display area, and the display area comprises a conventional display area of each of the display panels and a spliced display area located between two adjacent conventional display areas, and the conventional display area comprises a first sub-area and a second sub-area located between the first sub-area and the spliced display area.

The display module further comprises a groove disposed between the two adjacent display panels and located in the second sub-area and the spliced display area, and a light guiding portion disposed in the groove.

The light guiding portion comprises a light guide body disposed in the groove, and the light guide body comprises a light-incident surface near a bottom of the groove and a light-exiting surface away from the bottom of the groove, an orthographic projection of the light-incident surface on the two adjacent display panels is located in the second sub-area, an orthographic projection of the light-exiting surface on the two adjacent display panels covers the second sub-area and the spliced display area, and a surface of the light guiding portion away from the bottom of the groove is flush with a surface of the display panels in the first sub-area.

In an embodiment of the present application, the light guide body comprises a plurality of optical fiber strips, and each of the optical fiber strips comprises a first end located on the light-incident surface and a second end located on the light-exiting surface.

In an embodiment of the present application, a distance from the second end of each of the optical fiber strips to a splicing position between the two adjacent display panels is less than a distance from the first end to the splicing position between the two adjacent display panels.

In an embodiment of the present application, in each light guide body, a length of each of the optical fiber strips gradually decreases in a direction away from the splicing position between the two adjacent display panels.

In an embodiment of the present application, the light-incident surface is flat, and the first ends of the optical fiber strips are flush.

In an embodiment of the present application, the light guiding portion further comprises a first colloid disposed on a side of the light guide body near the bottom of the groove, and a second colloid disposed on a side of the light guide body away from the first colloid, and a plurality of the optical fibers are embedded in the light guide body.

In an embodiment of the present application, a side of the second colloid away from the first colloid is flat and flush with a surface of the display panels in the first sub-area.

In an embodiment of the present application, each of the display panels comprises a first flexible substrate and a second flexible substrate that are disposed oppositely, a first functional substrate disposed on a side of the first flexible substrate away from the second flexible substrate and located in the first sub-area, and a second functional substrate disposed on a side of the second flexible substrate away from the first flexible substrate and located in the first sub-area.

The first flexible substrate and the second flexible substrate are disposed on the conventional display area and extend to the spliced display area, and the light guiding portion is disposed on a side of the first flexible substrate away from the second flexible substrate, and a surface of the second colloid away from the first colloid is flush with a surface of the first functional substrate away from the second functional substrate.

In an embodiment of the present application, each of the display panels further comprises a liquid crystal layer and a blocking wall that are disposed between the first flexible substrate and the second flexible substrate.

Portions of the first flexible substrate and the second flexible substrate in the spliced display area are bent and extend in a direction away from the first functional substrate, and the blocking wall is disposed on a side of the spliced display area near the conventional display area so that the liquid crystal layer is disposed in the conventional display area.

According to the above objects of the present application, the provided is a display device comprising a display module and a backlight assembly, wherein the display module comprises at least two display panels, two adjacent display panels are spliced in a first direction or a second direction, and the first direction is different from the second direction.

The display module comprises a display area, and the display area comprises a conventional display area of each of the display panels and a spliced display area located between two adjacent conventional display areas, and the conventional display area comprises a first sub-area and a second sub-area located between the first sub-area and the spliced display area.

The display module further comprises a groove disposed between the two adjacent display panels and located in the second sub-area and the spliced display area, and a light guiding portion disposed in the groove.

The light guiding portion comprises a light guide body disposed in the groove, and the light guide body comprises a light-incident surface near a bottom of the groove and a light-exiting surface away from the bottom of the groove, an orthographic projection of the light-incident surface on the two adjacent display panels is located in the second sub-area, an orthographic projection of the light-exiting surface on the two adjacent display panels covers the second sub-area and the spliced display area, and a surface of the light guiding portion away from the bottom of the groove is flush with a surface of the display panel in the first sub-area;

The backlight assembly is disposed on a side of the display panel away from the light guiding portion.

In an embodiment of the present application, the light guide body comprises a plurality of optical fiber strips, and each of the optical fiber strips comprises a first end located on the light-incident surface and a second end located on the light-exiting surface.

In an embodiment of the present application, a distance from the second end of each of the optical fiber strips to a splicing position between the two adjacent display panels is less than a distance from the first end to the splicing position between the two adjacent display panels.

In an embodiment of the present application, in each light guide body, a length of each of the optical fiber strips gradually decreases in a direction away from the splicing position between the two adjacent display panels.

In an embodiment of the present application, the light-incident surface is flat, and the first ends of the optical fiber strips are flush.

In an embodiment of the present application, the light guiding portion further comprises a first colloid disposed on a side of the light guide body near the bottom of the groove, and a second colloid disposed on a side of the light guide body away from the first colloid, and a plurality of the optical fibers are embedded in the light guide body.

In an embodiment of the present application, a side of the second colloid away from the first colloid is flat and flush with a surface of the display panels in the first sub-area.

In an embodiment of the present application, each of the display panels comprises a first flexible substrate and a second flexible substrate that are disposed oppositely, a first functional substrate disposed on a side of the first flexible substrate away from the second flexible substrate and located in the first sub-area, and a second functional substrate disposed on a side of the second flexible substrate away from the first flexible substrate and located in the first sub-area.

The first flexible substrate and the second flexible substrate are disposed on the conventional display area and extend to the spliced display area, and the light guiding portion is disposed on a side of the first flexible substrate away from the second flexible substrate, and a surface of the second colloid away from the first colloid is flush with a surface of the first functional substrate away from the second functional substrate.

In an embodiment of the present application, each of the display panels further comprises a liquid crystal layer and a blocking wall that are disposed between the first flexible substrate and the second flexible substrate.

Portions of the first flexible substrate and the second flexible substrate in the spliced display area are bent and extend in a direction away from the first functional substrate, and the blocking wall is disposed on a side of the spliced display area near the conventional display area so that the liquid crystal layer is disposed in the conventional display area.

Beneficial Effects

In comparison with the prior art, a light guiding portion is provided between two adjacent display panels in the present application to direct light in the display panel into the spliced display area through the light guide body in the light guiding portion, so that light can be emitted from the spliced display area of the display module, thereby eliminating the splicing seam of the display module and improving the display effect of the display module.

DESCRIPTION OF THE DRAWINGS

The technical solutions and other beneficial effects of the present application will be apparent from the following detailed description of the specific embodiments of the present application with reference to the accompanying drawings.

EMBODIMENTS OF THE INVENTION

Figure 1:
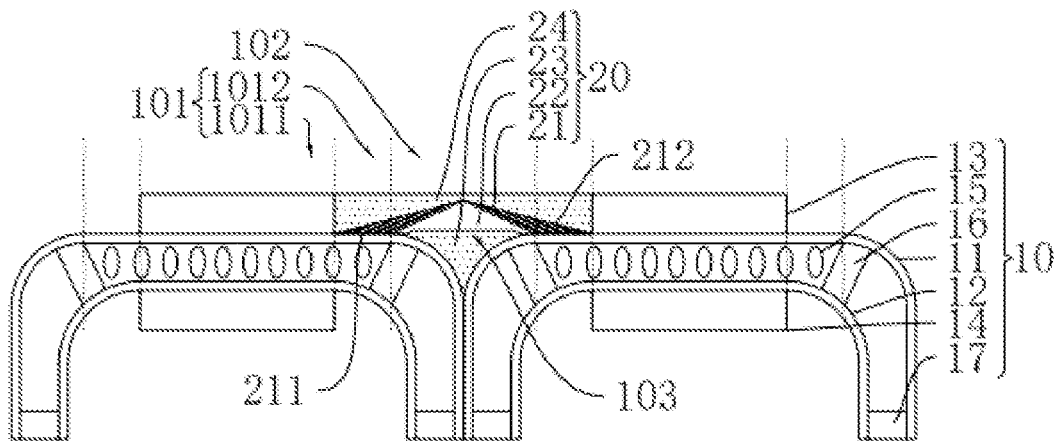
FIG. 1 is a schematic structural diagram of a display module according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative effort fall within the protection scope of the present application.

The following disclosure provides various embodiments or examples for implementing various structures of the present application. To simplify the disclosure of the present application, parts and settings of specific embodiments are described as follows. Certainly, they are only illustrative, and are not intended to limit the present application. Further, reference numerals and/or reference letters may be repeated in different embodiments of the present application. This repetition is for purposes of simplicity and clarity and does not indicate a relationship of the various embodiments and/or the settings. Furthermore, the present application provides specific embodiments of various processes and materials, however, applications of other processes and/or other materials may be appreciated by those ordinary skilled in the art.

Figure 2:
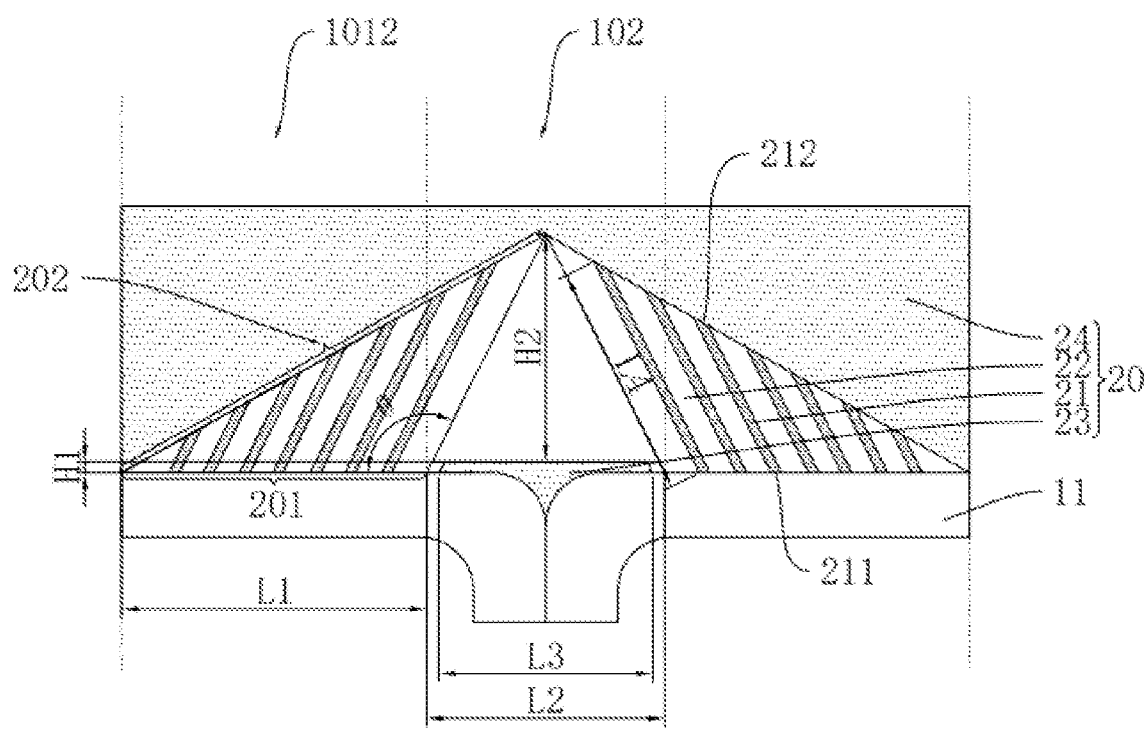
FIG. 2 is a schematic structural diagram of a light guiding portion according to an embodiment of the present application.

Embodiments of the present application provide a display module. Referring to FIGS. 1 and 2, the display module comprises at least two display panels 10. Two adjacent display panels 10 are spliced in a first direction or a second direction, and the first direction is different from the second direction.

The display module comprises a display area comprising a conventional display area 101 of each display panel and a spliced display area 102 located between two adjacent conventional display areas 101. The conventional display area 101 comprises a first sub-area 1011 and a second sub-area 1012 located between the first sub-area 1011 and the spliced display area 102.

Furthermore, the display module further comprises a groove 103 disposed between the two adjacent display panels 10 and located in the second sub-area 1012 and the spliced display area 102, and a light guiding portion 20 disposed in the groove 103.

The light guiding portion 20 comprises a light guide body 22 disposed in the groove 103. The light guide body 22 comprises a light-incident surface 201 near a bottom of the groove 103 and a light-exiting surface 202 away from the bottom of the groove 103. An orthographic projection of the light-incident surface 201 on the two adjacent display panels 10 is located in the second sub-area 1012, and an orthographic projection of the light-exiting surface 202 on the two adjacent display panels 10 covers the second sub-area 1012 and the spliced display area 102. A surface of the light guiding portion 20 away from the bottom of the groove 103 is flush with a surface of the display panel 10 located within the first sub-area 1011.

During implementation of embodiments of the present application, a light guiding portion 20 is disposed between two display panels 10 that are spliced with each other, and the light guiding portion 20 comprises a light guide body 22. A light-incident surface 201 of the light guide body 22 is located in the conventional display area 101 of the display panel 10, and a light-exiting surface 202 of the light guide body 22 covers a second sub-area 1012 and a spliced display area 102. By this configuration, the light guide body 22 can direct light from the conventional display area 101 into the spliced display area 102, so that light can also be emitted at the splice of the two splicing display panels 10, thereby eliminating splicing seams and improving display effect of the display module. Moreover, the light guiding portion 20 in the embodiments of the present application is disposed in a groove 103 that is located between two adjacent display panels 10, and may fill the groove 103, thereby the splice and other regions of two adjacent display panels 10 form a flat surface to further improve display effect and the yield of the display module.

Specifically, with continued to refer to FIGS. 1 and 2, the display module provided in this embodiment of the present applicant comprises at least two display panels 10, and two adjacent display panels 10 are spliced in a first direction or a second direction. In this embodiment of the present applicant, the first direction may be perpendicular to the second direction. In FIG. 1, only two display panels 10 that are spliced together are shown as an example for explanation.

The display module comprises a display area, and the display area comprises a conventional display area 101 of each display panel 10 and a spliced display area 102 located between two adjacent conventional display areas 101. It can be understood that the conventional display area 101 is an area of each display panel 10 that can normally emit light, and the spliced display area 102 is an area in which two adjacent display panels 10 are spliced, and the display panel 10 corresponding to the spliced display area 102 does not have a light emitting function. The conventional display area 101 comprises a first sub-area 1011 and a second sub-area 1012 located between the first sub-area 1011 and the spliced display area 102.

In an embodiment of the present application, each of display panels 10 comprises a first flexible substrate 11 and a second flexible substrate 12 disposed opposite to the first flexible substrate 11, a first functional substrate 13 disposed on a side of the first flexible substrate 11 away from the second flexible substrate 12, a second functional substrate 14 disposed on a side of the second flexible substrate 12 away from the first flexible substrate 11, and a liquid crystal layer 15, a blocking wall 16, and a light shielding portion 17 that are disposed between the first flexible substrate 11 and the second flexible substrate 12.

The portion of the first flexible substrate 11 in the conventional display area 101 is of a flat structure, and the portion of the first flexible substrate 11 in the spliced display area 102 is bent and extends in a direction away from the first functional substrate 13. Similarly, the portion of the second flexible substrate 12 in the first sub-area 1011 of the conventional display area 101 is of a flat structure, and the portion of the second flexible substrate 12 in the second sub-area 1012 and the spliced display area 102 is bent and extends in a direction away from the first functional substrate 13. The first functional substrate 13 is disposed on a side of the first flexible substrate 11 away from the second flexible substrate 12 and disposed within the first sub-area 1011, and the second functional substrate 14 is disposed on a side of the second flexible substrate 12 away from the first flexible substrate 11 and disposed within the first sub-area 1011. The bent first flexible substrate 11 of one display panel 10 is connected to that of another adjacent display panel 10 to form a spliced display area 102.

It should be noted that, each of display panels 10 further comprises a thin film transistor array layer, an electrode layer, an alignment layer, and the like that are disposed on a side of the second flexible substrate 12 near the first flexible substrate 11, and a color filter layer, an electrode layer, an alignment layer, and the like that are disposed on a side of the first flexible substrate 11 near the second flexible substrate 12. The first functional substrate 13 comprises a first glass substrate disposed on a side of the first flexible substrate 11 away from the second flexible substrate 12, and a first polarizer disposed on a side of the first glass substrate away from the first flexible substrate. The second functional substrate 14 comprises a second glass substrate disposed on a side of the second flexible substrate 12 away from the first flexible substrate 11, and a second polarizer disposed on a side of the second glass substrate away from the second flexible substrate.

In an embodiment of the present application, the blocking wall 16 is disposed on a side of the spliced display area 102 near the conventional display area 101 so as to confine the liquid crystal layer 15 in the conventional display area 101. The blocking wall 16 may be made of border adhesive, thereby binding the first flexible substrate 11 and the second flexible substrate together, while defining the liquid crystal layer 15. Alternatively, the blocking wall 16 may be made of other organic resin material, and border adhesive is disposed on opposite sides of the blocking wall 16 to bind the first flexible substrate 11 and the second flexible substrate 12. The light shielding portion 17 is disposed between the first flexible substrate 11 and the second flexible substrate 12 and is located in the spliced display area 102. The light shielding portion 17 may be disposed on a side of the blocking wall 16 away from the liquid crystal layer 15. The light shielding portion 17 may be made of black photoresist material, thereby preventing light leakage and preventing foreign materials from entering the display panel 10.

The display module provided in the embodiments of the present application further comprises a groove 103 disposed between two adjacent display panels 10 and located in the second sub-area 1012 and the spliced display area 102, and a light guiding portion 20 disposed in the groove 103. The light guiding portion 20 comprises a light guide body 22 disposed in the groove 103. The light guide body 22 comprises a light-incident surface 201 near a bottom of the groove 103 and a light-exiting surface 202 away from the bottom of the groove 103. Orthographic projection of the light-incident surface 201 of the light guide body 22 on the two adjacent display panels 10 is located in the second sub-area 1012, and orthographic projection of the light-exiting surface 202 of the light guide body 22 on the two adjacent display panels 10 covers the second sub-area 1012 and the spliced display area 102. Since the first functional substrate 13 is disposed in the first sub-area 1011 of the display panel 10, the thickness of two adjacent display panels 10 in the second sub-area 1012 and the spliced display area 102 is less than the thickness of the display panels 10 in the respective first sub-area 1011 after the two adjacent display panels 10 are spliced, thereby forming the groove 103, which is within the second sub-area 1012 and the spliced display area 102, between the two adjacent display panels 10.

It can be understood that the light guide body 22 is located between two adjacent display panels 10, and comprises two light-incident surfaces 201 respectively located in two second sub-areas 1012 of the two adjacent display panels 10, so as to guide the light exiting from the two second sub-areas 1012 of the two display panels 10 into the spliced display area 102, so that the light may be emitted from the spliced display area 102 between the two adjacent display panels 10, thereby eliminating splicing seams and improving display effect of the display module.

Further, the surface of the light guiding portion 20 away from the bottom of the groove 103 is flush with the surface of the display panel 10 located in the first sub-area 1011 and adjacent to the groove 103, so that the light-exiting side of the display module has a flush surface to further improve the display effect of the display module.

The cross-section of the light guide body 22 is of a triangular structure, and the light guide body 22 comprises a plurality of optical fiber strips 21 embedded in the light guide body 22. In addition, the light guiding portion 20 further comprises a first colloid 23 disposed on a side of the light guide body 22 near the bottom of the groove 103 and a second colloid 24 disposed on a side of the light guide body 22 away from the first colloid 23. The light guide body 22 is attached to the groove 103 through the first colloid 23, and the second colloid 24 covers the side of the light guide body 22 away from the first colloid 23. The surface of the second colloid 24 away from the light guide body 22 is flush with the surface of the first functional substrate 13 away from the second functional substrate 14.

Optionally, both of the first colloid 23 and the second colloid 24 may be OCA optical adhesives. A material for making the light guide body 22 other than the optical fiber strip 21 includes at least one of acrylonitrile-butadiene-styrene plastic (ABS), ultraviolet curing ink (UV ink), polymethyl methacrylate (PMMA), and polycarbonate (PC). The above-mentioned material is an optically thinner medium with respect to the optical fiber strip 21, thereby effectively reducing refraction of light in the material, reducing light emitted at other angles, and ensuring transmission stability of the light along the optical fiber strip 21. Meanwhile, the material of the light guide body 22 has a stable performance, so as to well protect the optical fiber strip 21.

In the embodiments of the present application, the optical fiber strips 21 are embedded in the light guide body 22, and the plurality of optical fiber strips 21 may be distributed in parallel between the light-incident surface 201 and the light-exiting surface 202. Specifically, the light guide body 22 comprises two light-incident surfaces 201 respectively corresponding to the second sub-areas 1012 of the two adjacent display panels 10, and a plurality of optical fiber strips 21 are respectively arranged between the light-incident surface 201 and the light-exiting surface 202.

Specifically, with continued to refer to FIGS. 1 and 2, each optical fiber strip 21 comprises a first end 211 disposed on the light-incident surface 201 and a second end 212 disposed on the light-exiting surface 202. The plurality of first ends 211 may be connected to portions of two adjacent display panels 10 respectively located in the second sub-areas 1012, so as to direct light, which exits from the second sub-areas 1012 of the two adjacent display panels 10, to the second end 212 through the first end 211. The second ends 212 of the plurality of optical fiber strips 21 are distributed on the light-exiting surface 202, and the light-exiting surface 202 corresponds to the spliced display area 102 and the second sub-area 1012, thereby the light exiting from the second sub-area 1012 may be directed to the spliced display area 102, so that light may be emitted from the splice between the two adjacent display panels 10.

In the embodiments of the present application, the distance from the second end 212 of each optical fiber strip 21 to the splice between the two adjacent display panels 10 is less than the distance from the first end 211 to the splice between the two adjacent display panels 10, so that the optical fiber strips 21 are arranged obliquely in the light guide body 22. Specifically, as shown in FIG. 1, the second ends 212 of the plurality of optical fiber strips 21 that have the first ends 211 connected to the left display panel 10 is inclined in a direction near the right display panel 10, and the second ends 212 of the plurality of optical fiber strips 21 that have the first ends 211 connected to the right display panel 10 is inclined in a direction near the left display panel 10.

It should be noted that, since light is not emitted from the middle of the light guide body 22 between the display panels 10, i.e., the sliced display area 102, the optical fiber strip 21 is not disposed therein. That is, the light-incident surface 201 of the light guide body 22 does not cover the spliced display area 102. In the embodiments of the present application, the first colloid 23 fills a recess between two adjacent display panels 10 to form one side, and the other side of the first colloid 23 is attached to the light guide body 22. The middle region of the first colloid 23 corresponding to the light guide body 22 protrudes, so as to effectively support the recess between the two adjacent display panels 10, thereby preventing the light guide body 22 from being deformed in the recess, and avoiding effect on light guide of the plurality of optical fibers.

Further, in the embodiments of the present application, the second sub-area 1012 of the display panel 10 corresponding to the light-incident surface 201 of the light guide body 22 is flat, and thus the light-incident surface 201 of the light guide body 22 is also flat, so as to conform to the appearance of the display panel, thereby improving the light guide effect. The first ends 211 of the optical fiber strips 21 are flush with each other. The length of the optical fiber strips 21 is gradually reduced in a direction away from the splice of the two adjacent display panels 10, so that the second ends 212 of the optical fiber strips 21 are arranged in inclined lines. Since the plurality of optical fiber strips 21 are respectively connected to the two adjacent display panels on the left and right sides (as shown in FIG. 1), and the cross-section of the light guide body 22 is triangular, the second ends 212 of the plurality of optical fiber strips 21 are arranged along two sides of the triangular profile of the light guide body 22. In the spliced display area 102, the light guide body 22 directs light to a position farther away from the second sub-area 1012, the longer the optical path of the light. Further, in the embodiments of the present application, the closer to the splicing position of two adjacent display panels 10 (that is, the position in the splicing display area 102 farther away from the second sub-area 1012), the longer the optical fiber strip 21 is, the better the light guide effect of the optical fiber strip 21 is, so as to improve the yield of conductivity of the long optical path light and the display effect of the display module in the spliced display area 102.

With reference to FIGS. 1 and 2, in the embodiments of the present application, optionally, in the two adjacent display panels 10, the length L1 of the light-incident surface 201 of the light guide body 22 corresponding to one of the display panels 10 is greater than or equal to 9 mm and less than or equal to 11 mm, and the distance L2 between the two light-incident surfaces 201 of the light guide body 201 is greater than or equal to 3.7 mm and less than or equal to 4.1 mm. The length L3 of the first colloid 23 protruding upwardly is greater than or equal to 3.2 mm and less than or equal to 4.2 mm. The maximum length L4 of the plurality of optical fiber strips 21 is greater than or equal to 14.72 mm and less than or equal to 16.72 mm. The height H1 of the first colloid 23 protruding upwardly is greater than or equal to 0.7 mm and less than or equal to 0.9 mm. The height H2 of the light guide body 22 in a third direction is greater than or equal to 14.6 mm and less than or equal to 16.6 mm, wherein the third direction shows the light exit direction of the module. Angle of inclination θ of each optical fiber strip 21 is greater than or equal to 95.13° and less than or equal to 99.13°.

As can be seen from the above, in the embodiments of the present application, a light guiding portion 20 is disposed between two display panels 10 that are spliced with each other. The light guiding portion 20 comprises a light guide body 22, and a light-incident surface 201 of the light guide body 22 is located in a conventional display area 101 of the display panel 10, and a light-exiting surface 202 of the light guide body 22 covers a second sub-area 1012 and a spliced display area 102. By this configuration, the light guiding portion 20 can direct the light in the conventional display area 101 into the spliced display area 102, so that the splicing position of the two display panels 10 that are spliced to each other can also emit light to eliminate the splicing seam and improve the display effect of the display module. Moreover, the light guiding portion 20 in the embodiments of the present application is disposed in a groove 103 between the two adjacent display panels 10, and the groove 103 can be filled and flattened with the light guiding portion 20 so that the two adjacent display panels 10 are flat at the splicing position and at other positions to further improve the display effect and the yield of the display module.

Figure 3:
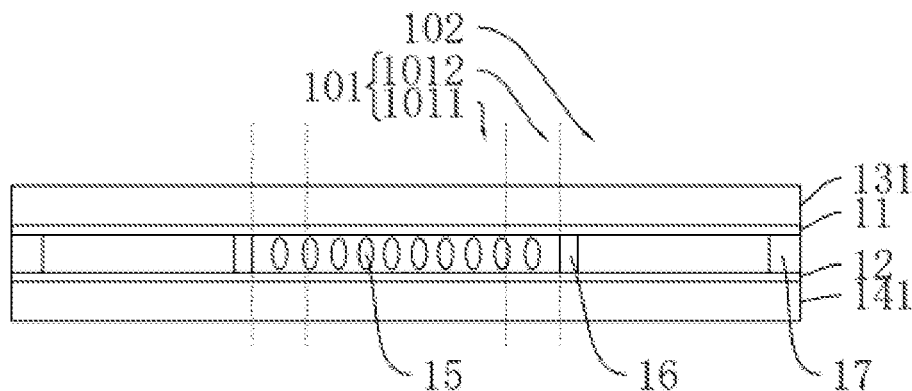
FIG. 3 is a schematic structural diagram of a manufacturing flow of a display module according to an embodiment of the present application.

In addition, the embodiments of the present application further provide a method for manufacturing the display module according to the above embodiments, with reference to FIGS. 1 to 5. The display module comprises a display area, and the display area comprises a conventional display area 101 of each display panel 10 and a spliced display area 102 located between two adjacent conventional display areas 101. The conventional display area 101 comprises a first sub-area 1011 and a second sub-area 1012 located between the first sub-area 1011 and the spliced display area 102. The method for manufacturing the display module comprises the following steps:

As shown in FIG. 3, a first panel is provided, and the first panel comprises a first flexible substrate 11 and a second flexible substrate 12 that are oppositely disposed, a first mother plate 131 disposed on a side of the first flexible substrate 11 away from the second flexible substrate 12, a second mother plate 141 disposed on a side of the second flexible substrate 12 away from the first flexible substrate 11, and a liquid crystal layer 15, a blocking wall 16, and a light shielding portion 17 that are disposed between the first flexible substrate 11 and the second flexible substrate 12.

A color filter layer, an electrode layer, an alignment layer, and the like are disposed on a side of the first flexible substrate 11 near the second flexible substrate 12, and a thin film transistor array layer, an electrode layer, an alignment layer, and the like are disposed on a side of the second flexible substrate 12 near the first flexible substrate 11.

In the embodiments of the present application, the blocking wall 16 is disposed on a side of the spliced display area 102 near the conventional display area 101 so as to define the liquid crystal layer 15 within the conventional display area 101. The blocking wall 16 may be made of border adhesive, thereby binding the first flexible substrate 11 and the second flexible substrate together, while defining the liquid crystal layer 15. Alternatively, the blocking wall 16 may be made of other organic resin material, and border adhesive is disposed on a side of the blocking wall 16 to bind the first flexible substrate 11 and the second flexible substrate 12. The light shielding portion 17 may be made of a black photoresist material, and may further function to prevent light leakage and foreign materials from entering the display panel 10.

Figure 4:
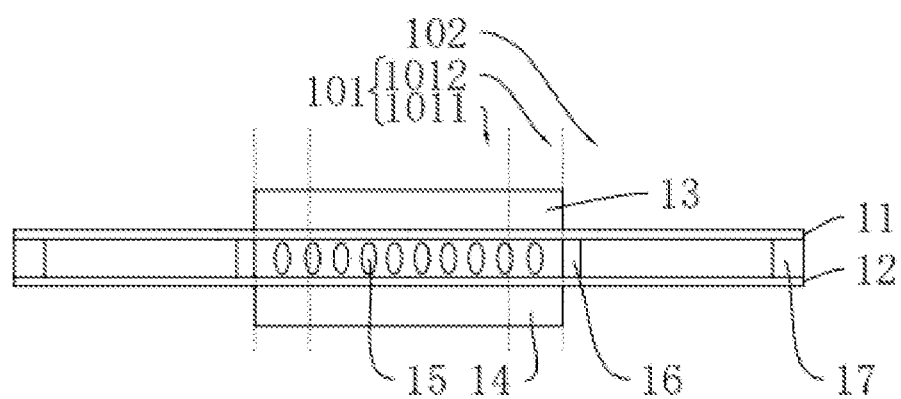
FIG. 4 is a schematic structural diagram of a manufacturing flow of a display module according to an embodiment of the present application.

Then, as shown in FIGS. 3 and 4, a first mother plate 131 and a second mother plate 141 are cut, that is, portions of the first mother plate 131 and the second mother plate 141 located outside a first sub-area 1011 are cut and removed, so as to obtain a first glass substrate located on a side of the first flexible substrate 11 away from the second flexible substrate 12 and located within the first sub-area 1011, and a second glass substrate located on a side of the second flexible substrate 12 away from the first flexible substrate 11 and located within a second sub-area 1012.

Next, as shown in FIG. 4, a first polarizer may be attached to a side of the first glass substrate away from the first flexible substrate 11 to obtain a first functional substrate 13, and a second polarizer may be attached to the second glass substrate away from the second flexible substrate 12 to obtain a second functional substrate 14.

Figure 5:
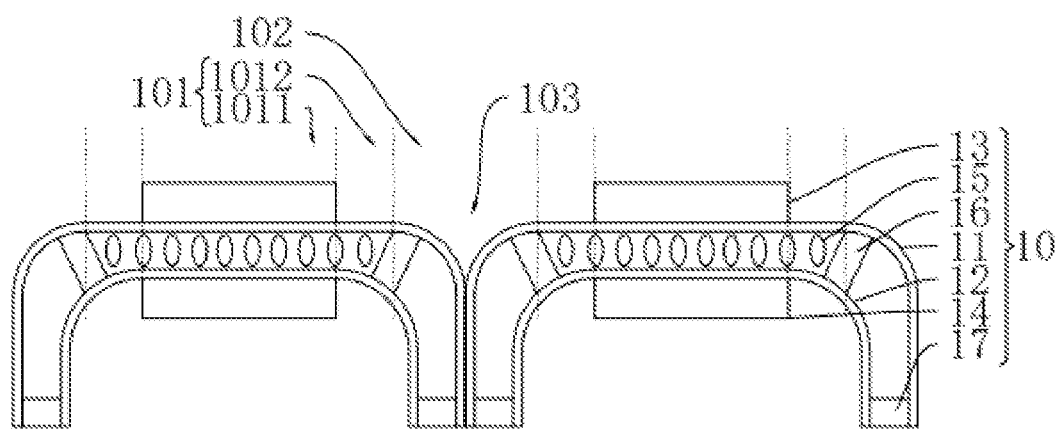
FIG. 5 is a schematic structural diagram of a manufacturing process of a display module according to an embodiment of the present application.

Then, as shown in FIG. 5, portions of the first flexible substrate 11 and the second flexible substrate 12 of each display panel 10 located within the spliced display area 102 are bent in a direction away from the first functional substrate 13, and two adjacent display panels 10 are spliced together (as shown in FIG. 5). Since the first functional substrate 13 is located only in the first sub-area 1011, a groove 103 is formed in the second sub-area 1012 and the spliced display area 102 after the two adjacent display panels 10 are spliced. Further, since the first flexible substrate 11 and the second flexible substrate 12 are bent in the spliced display area 102, a recess is formed at the splice of the two adjacent display panels 10, that is, a recess is formed at the bottom of the groove 103.

Next, as shown in FIGS. 1 and 2, a first colloid 23 is formed at the bottom of the groove 103, and the first colloid 23 fills the recess, and may protrude from a surface of the first flexible substrate 11 away from the second flexible substrate 12. A material for making the first colloid 23 includes an OCA optical adhesive.

A light guide body 22 into which a plurality of optical fiber strips 21 are embedded is attached to the first colloid 23, and thus the light guide body 22 is attached to the groove 103 through the first colloid 23. The light guide body 22 has two light-incident surfaces 201 near the first colloid 23 and a light-exiting surface 202 away from the first colloid 23, and the two light-incident surfaces 201 respectively correspond to sub-areas 1012 of the two adjacent display panels 10. Further, the first ends 211 of the plurality of optical fiber strips 21 are respectively located in the two light-incident surfaces 201, and the second ends 212 of the plurality of optical fiber strips 21 are respectively located in the light-exiting surfaces 202.

Finally, a second colloid 24 is formed in the groove 103 to form the display module, and a side of the second colloid 24 near the light guide body 22 covers the light guide body 22, and another side of the second colloid 24 away from the light guide body 22 is flat and flush with a surface of the first functional substrate 13 on the side away from the second functional substrate 14. The material for making the second colloid 24 includes an OCA optical adhesive.

In addition, the embodiments of the present application further provide a display device including the display module described in the embodiments and the display module produced by the method of manufacturing the display module described in the embodiments.

The display device further comprises a backlight assembly (not shown) disposed on a side of the display module. The backlight assembly is disposed on a side of the display panel 10 away from the light guiding portion 20, and the backlight assembly may be disposed on a side of the display panel 10 away from the light guiding portion 20 and correspond to at least the conventional display area 101 to provide backlight for the display panel 10.

In the above-described embodiments, the description of each embodiment has its own emphasis. For a part that is not described in detail In an embodiment, reference may be made to the relevant descriptions of other embodiments.

The display module and the display device provided in the embodiments of the present application are described in detail above. The principles and embodiments of the present application are described herein using specific examples. The description of the embodiments is merely intended to help understand the technical solution and the core ideas of the present application. It should be understood by those of ordinary skill in the art that the technical solutions described in the foregoing embodiments may still be modified, or some of the technical features thereof may be equally replaced. These modifications or replacements do not make the essence of the corresponding technical solutions deviate from the scope of the technical solutions of the embodiments of the present application.

What is claimed is:

1. A display module comprising at least two display panels, wherein two adjacent display panels are spliced in a first direction or a second direction, and the first direction being different from the second direction;
wherein the display module comprises a display area, and the display area comprises a conventional display area of each of the display panels and a spliced display area located between two adjacent conventional display areas, and the conventional display area comprises a first sub-area and a second sub-area located between the first sub-area and the spliced display area;
wherein the display module further comprises a groove disposed between the two adjacent display panels and located in the second sub-area and the spliced display area, and a light guiding portion disposed in the groove; and
wherein the light guiding portion comprises a light guide body disposed in the groove, and the light guide body comprises a light-incident surface near a bottom of the groove and a light-exiting surface away from the bottom of the groove, an orthographic projection of the light-incident surface on the two adjacent display panels is located in the second sub-area, an orthographic projection of the light-exiting surface on the two adjacent display panels covers the second sub-area and the spliced display area, and a surface of the light guiding portion away from the bottom of the groove is flush with a surface of the display panels in the first sub-area.

2. The display module according to claim 1, wherein the light guide body comprises a plurality of optical fiber strips, and each of the optical fiber strips comprises a first end located on the light-incident surface and a second end located on the light-exiting surface.

3. The display module according to claim 2, wherein a distance from the second end of each of the optical fiber strips to a splicing position between the two adjacent display panels is less than a distance from the first end to the splicing position between the two adjacent display panels.

4. The display module according to claim 3, wherein in each light guide body, a length of each of the optical fiber strips gradually decreases along a direction away from the splicing position between the two adjacent display panels.

5. The display module according to claim 4, wherein the light-incident surface is flat, and the first ends of the optical fiber strips are flush.

6. The display module according to claim 2, wherein the light guiding portion further comprises a first colloid disposed on a side of the light guide body near the bottom of the groove, and a second colloid disposed on a side of the light guide body away from the first colloid, and a plurality of the optical fibers are embedded in the light guide body.

7. The display module according to claim 6, wherein a side of the second colloid away from the first colloid is flat and flush with a surface of the display panels in the first sub-area.

8. The display module according to claim 7, wherein each of the display panels comprises a first flexible substrate and a second flexible substrate that are disposed oppositely, a first functional substrate disposed on a side of the first flexible substrate away from the second flexible substrate and located in the first sub-area, and a second functional substrate disposed on a side of the second flexible substrate away from the first flexible substrate and located in the first sub-area;
wherein the first flexible substrate and the second flexible substrate are disposed on the conventional display area and extend to the spliced display area, and the light guiding portion is disposed on a side of the first flexible substrate away from the second flexible substrate, and a surface of the second colloid away from the first colloid is flush with a surface of the first functional substrate away from the second functional substrate.

9. The display module according to claim 8, wherein each of the display panels further comprises a liquid crystal layer and a blocking wall that are disposed between the first flexible substrate and the second flexible substrate; and wherein portions of the first flexible substrate and the second flexible substrate in the spliced display area are bent and extend in a direction away from the first functional substrate, and the blocking wall is disposed on a side of the spliced display area near the conventional display area so that the liquid crystal layer is disposed in the conventional display area.

10. A display device comprising a display module and a backlight assembly, wherein the display module comprises at least two display panels, two adjacent display panels are spliced in a first direction or a second direction, and the first direction is different from the second direction;

the display module comprises a display area, and the display area comprises a conventional display area of each of the display panels and a spliced display area located between two adjacent conventional display areas, and the conventional display area comprises a first sub-area and a second sub-area located between the first sub-area and the spliced display area;

wherein the display module further comprises a groove disposed between the two adjacent display panels and located in the second sub-area and the spliced display area, and a light guiding portion disposed in the groove;

wherein the light guiding portion comprises a light guide body disposed in the groove, and the light guide body comprises a light-incident surface near a bottom of the groove and a light-exiting surface away from the bottom of the groove, an orthographic projection of the light-incident surface on the two adjacent display panels is located in the second sub-area, an orthographic projection of the light-exiting surface on the two adjacent display panels covers the second sub-area and the spliced display area, and a surface of the light guiding portion away from the bottom of the groove is flush with a surface of the display panel in the first sub-area; and the backlight assembly is disposed on a side of the display panel away from the light guiding portion.

11. The display device according to claim 10, wherein the light guide body comprises a plurality of optical fiber strips, and each of the optical fiber strips comprises a first end located on the light-incident surface and a second end located on the light-exiting surface.

12. The display device according to claim 11, wherein a distance from the second end of each of the optical fiber strips to a splicing position between the two adjacent display panels is less than a distance from the first end to the splicing position between the two adjacent display panels.

13. The display device according to claim 12, wherein in each light guide body, a length of each of the optical fiber strips gradually decreases along a direction away from the splicing position between the two adjacent display panels.

14. The display device according to claim 13, wherein the light-incident surface is flat, and the first ends of the optical fiber strips are flush.

15. The display device according to claim 11, wherein the light guiding portion further comprises a first colloid disposed on a side of the light guide body near the bottom of the groove, and a second colloid disposed on a side of the light guide body away from the first colloid, and a plurality of the optical fibers are embedded in the light guide body.

16. The display device according to claim 15, wherein a side of the second colloid away from the first colloid is flat and flush with a surface of the display panels in the first sub-area.

17. The display device according to claim 16, wherein each of the display panels comprises a first flexible substrate and a second flexible substrate that are disposed oppositely, a first functional substrate disposed on a side of the first flexible substrate away from the second flexible substrate and located in the first sub-area, and a second functional substrate disposed on a side of the second flexible substrate away from the first flexible substrate and located in the first sub-area; and wherein the first flexible substrate and the second flexible substrate are disposed on the conventional display area and extend to the spliced display area, and the light guiding portion is disposed on a side of the first flexible substrate away from the second flexible substrate, and a surface of the second colloid away from the first colloid is flush with a surface of the first functional substrate away from the second functional substrate.

18. The display device according to claim 17, wherein each of the display panels further comprises a liquid crystal layer and a blocking wall that are disposed between the first flexible substrate and the second flexible substrate; and wherein portions of the first flexible substrate and the second flexible substrate in the spliced display area are bent and extend in a direction away from the first functional substrate, and the blocking wall is disposed on a side of the spliced display area near the conventional display area so that the liquid crystal layer is disposed in the conventional display area.

* * * * *